United States Patent [19]

Cok

[11] Patent Number: 5,432,909
[45] Date of Patent: Jul. 11, 1995

[54] METHOD AND APPARATUS FOR REDISTRIBUTING MULTIPLE DISTRIBUTED DATA SETS IN A RING CONNECTED MULTIPROCESSOR

[75] Inventor: Ronald Steven Cok, Rochester, N.Y.

[73] Assignee: Eastman Kodak Company, Rochester, N.Y.

[21] Appl. No.: 350,513

[22] Filed: Dec. 6, 1994

Related U.S. Application Data

[63] Continuation of Ser. No. 866,723, Apr. 10, 1992, abandoned.

[51] Int. Cl.$^6$ ........................................... G06F 15/163
[52] U.S. Cl. ..................... 395/200; 395/600; 370/85.5; 364/DIG. 1; 364/229.3; 364/241.8; 364/245; 364/246; 364/282.4; 364/284; 364/284.3
[58] Field of Search ............... 395/200, 600; 370/85.5

[56] References Cited

U.S. PATENT DOCUMENTS

| | | | |
|---|---|---|---|
| 4,460,994 | 7/1984 | Scanlon et al. | 370/85.7 |
| 4,667,287 | 5/1987 | Allen et al. | 395/800 |
| 4,752,924 | 6/1988 | Darnell et al. | 370/85.15 |
| 5,129,093 | 7/1992 | Muramatsu et al. | 395/800 |
| 5,202,971 | 4/1993 | Henson et al. | 395/425 |
| 5,230,073 | 7/1993 | Guasmann et al. | 395/600 |
| 5,241,540 | 8/1993 | Ocheltree | 370/85.12 |

*Primary Examiner*—Thomas G. Black
*Assistant Examiner*—Wayne Amsbury
*Attorney, Agent, or Firm*—Thomas H. Close

[57] ABSTRACT

A method and apparatus for interprocessor communication using a ring of processors linked together with independent direct memory access type communication interfaces. The interfaces simultaneously input and output data in both directions around the ring. Four I/O memory buffers to support simultaneous communication in both directions. The ring of processors together pass each data packet half way around the ring in each direction. As each data packet or data subset enters the processor it is stored either in a temporary I/O buffer for later retransmission around the ring in the same direction as originally travelling or stored in the final destination data array. The output of data stored locally destined for another processor is intermingled with the data which is retransmitted.

3 Claims, 9 Drawing Sheets

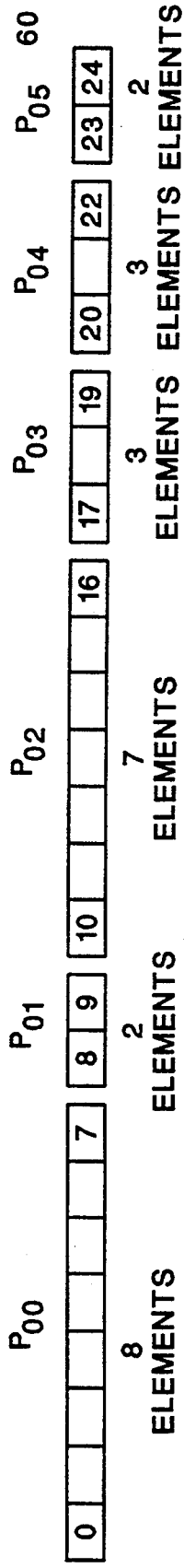
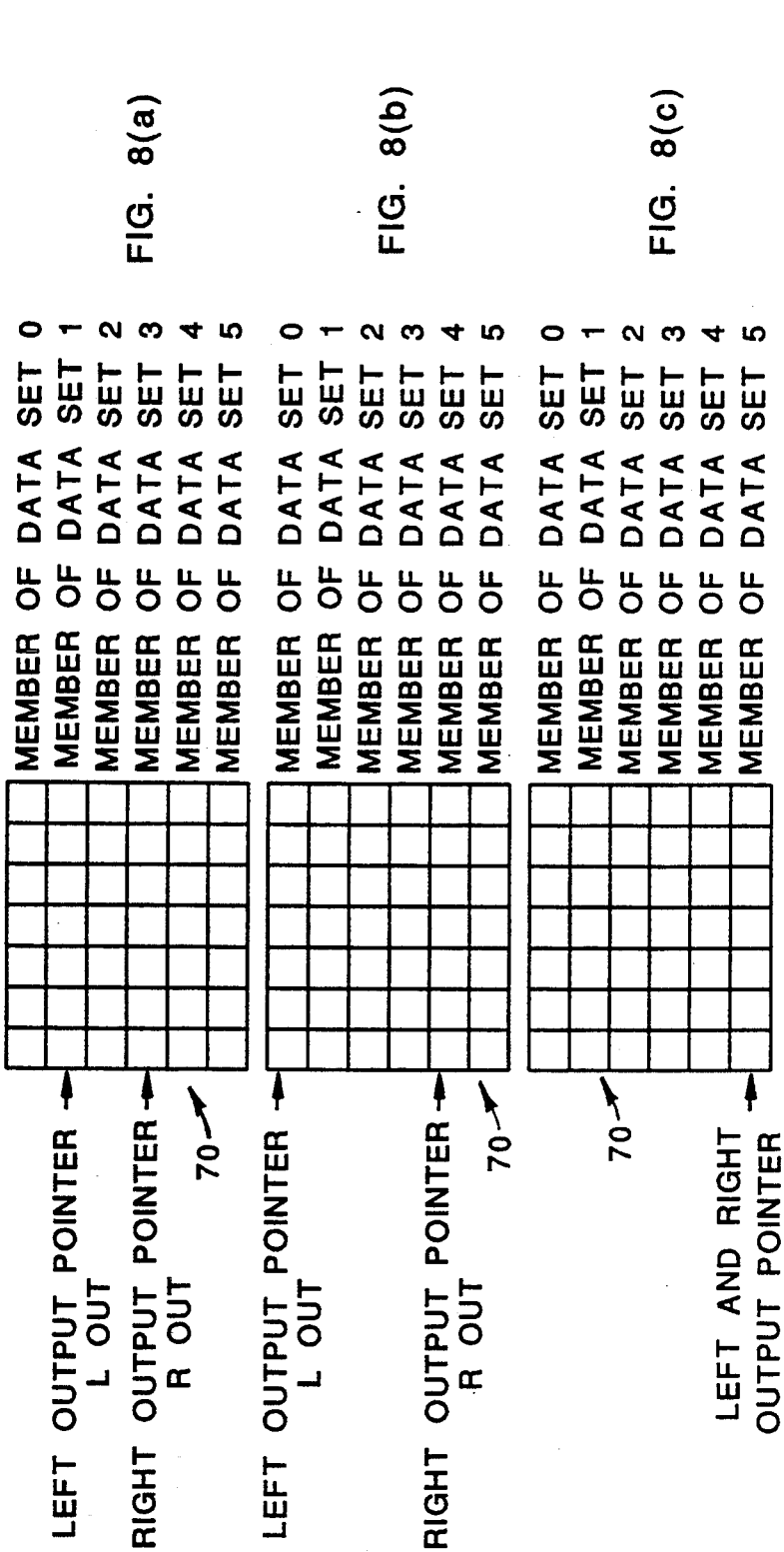
FIG. 7
FIG. 8(a)
FIG. 8(b)
FIG. 8(c)

METHOD AND APPARATUS FOR REDISTRIBUTING MULTIPLE DISTRIBUTED DATA SETS IN A RING CONNECTED MULTIPROCESSOR

This is a Continuation of application Ser. No. 07/866,723, filed Apr. 10, 1992, now abandoned.

BACKGROUND OF THE INVENTION

1. Field of the Invention

The present invention is directed to a method and apparatus for redistributing multiple distributed data sets in a multiprocessor ring so that every processor will contain one unique, complete data set comprised from a group of data subsets where each subset is a part of the corresponding data set and is originally distributed among the processors and, more particularly, a method and apparatus which consolidates distributed data subsets into a single data set by using bidirectional communication within the ring of processors to transfer each subset of the distributed data set the minimum distance necessary and which requires a minimum of additional buffer space within each processor.

2. Description of the Related Art

Parallel computers are becoming increasingly popular as a means of achieving high-performance computing. A parallel computer is a computer which is composed of more than one independent processor unit. These computers are often divided into different classes which reflect the organization of the processors and memory in the computer. Those computers whose processors share a common memory to which every processor has direct access are called shared-memory parallel computers. Those computers whose processors each have a separate memory which cannot be accessed by any other processor are called distributed-memory parallel computers. While the processors in a distributed-memory computer cannot access each other's memory, they can communicate information with each other by sending and receiving messages over their interprocessor communication links or by a shared communication channel.

These two types of computers each have advantages and disadvantages with respect to different kinds of computing tasks. A shared-memory parallel computer is most effective on tasks which have a relatively low number of memory accesses but whose memory accesses are very unpredictable and can be to any portion of the common memory. The performance of a shared-memory machine is limited by the shared memory access bandwidth. In contrast, a distributed-memory parallel computer is most effective when the memory accesses are very heavy but relatively well-organized and segmented. Distributed-memory parallel computer performance is limited by the link communication bandwidth. The present invention relates to a communication method for distributed-memory parallel computers with at least two bidirectional communication lines per node.

Because the performance of distributed-memory parallel computers is limited by the communication bandwidth between the processors, it is important to minimize the inter-processor communication and thus maximize the computer's performance. To minimize the inter-processor communication, one must organize the distribution of data carefully so that each processor has all the data that the processor needs. Unfortunately, this cannot be done in any general sense. The access of data in an algorithm is simply dependent on the algorithm itself. Different algorithms will access data in different ways.

To minimize this problem, programmers will generally choose some compromise for their data distribution which reduces the interprocessor communication for the most common operations on their data set. However, there will always be some operations for which an alternative data distribution is superior.

The most common data distribution scheme for distributed-memory parallel processors is one in which each processor has an equal amount of data and no data is stored in more than one processor. The data are grouped within the processors in such a way as to minimize any interprocessor communication. Nevertheless, it is also fairly common for computing tasks to be more efficiently executed if a complete data set is stored in each processor.

For this kind of task there are two alternative communicating methods which are commonly used. The first is to have each processor request only the needed data from whichever processor has the data by sending messages through the communication links. The second is to simply redistribute or consolidate the distributed data subsets so that each processor has a different, complete data set. Each processor can then process one complete data set by itself. This is most efficient when there are at least as many distributed data sets as there are processors in the ring.

The first alternative will communicate only the necessary data but in a random way and with additional messaging required to support the request/reply cycle. The second alternative may move more data but does it in a very organized and optimizable way which is much more likely to saturate the available link bandwidth. The preferred alternative will again depend on the application program requirements.

If a redistribution of all the data from every processor is chosen, it is imperative that the implementation of this task be as efficient as possible.

SUMMARY OF THE INVENTION

It is an object of the present invention to efficiently redistribute the distributed data subsets of a group of data sets.

It is another object of the present invention to efficiently consolidate distributed subsets of a data set into a single processor.

It is a further object of the present invention to maximize utilization of the bandwidth of ring communication links.

It is a further object of the present invention to transmit each data subset the minimum distance.

The above objects can be attained by a method and apparatus for interprocessor communication using processors linked together with independent direct memory access type communication interfaces which simultaneously input and output data in both directions around the ring. The system uses four I/O memory buffers to support simultaneous communication in both directions. A destination data buffer stores the input data set. Two data input pointers are maintained whose position in the destination data buffer correspond to the storage location for data to be input from the left and right neighboring processors and two other data pointers are maintained whose positions in the original data memory correspond to the storage location for data to be output to the left and right neighboring processors. The ring of processors together pass each data packet half way around the ring in each direction. Each processor knows the number of processors in the ring and by counting communication operations each processor can calculate whether data should be passed on to neighboring processors or stored locally. As each data packet enters the processor, the data packet is stored either in a temporary I/O buffer for later retransmission around the ring in the same direction as it is originally travelling or stored in the final destination data array. The present invention provides efficient implementation of redistribution or consolidation of a group of distributed data sets because it fully utilizes the links between processors and communicates data the minimum distance necessary allowing communication bandwidth utilization to be maximized.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 7 illustrates distribution of twenty-five data elements of a data set into six data subsets over a six processor ring;

FIGS. 8(a)-8(c) illustrate output pointer positions for the six processor ring of FIG. 5 for three stages or cycles of processor $P_{02}$;

DESCRIPTION OF THE PREFERRED EMBODIMENTS

Figure 1:
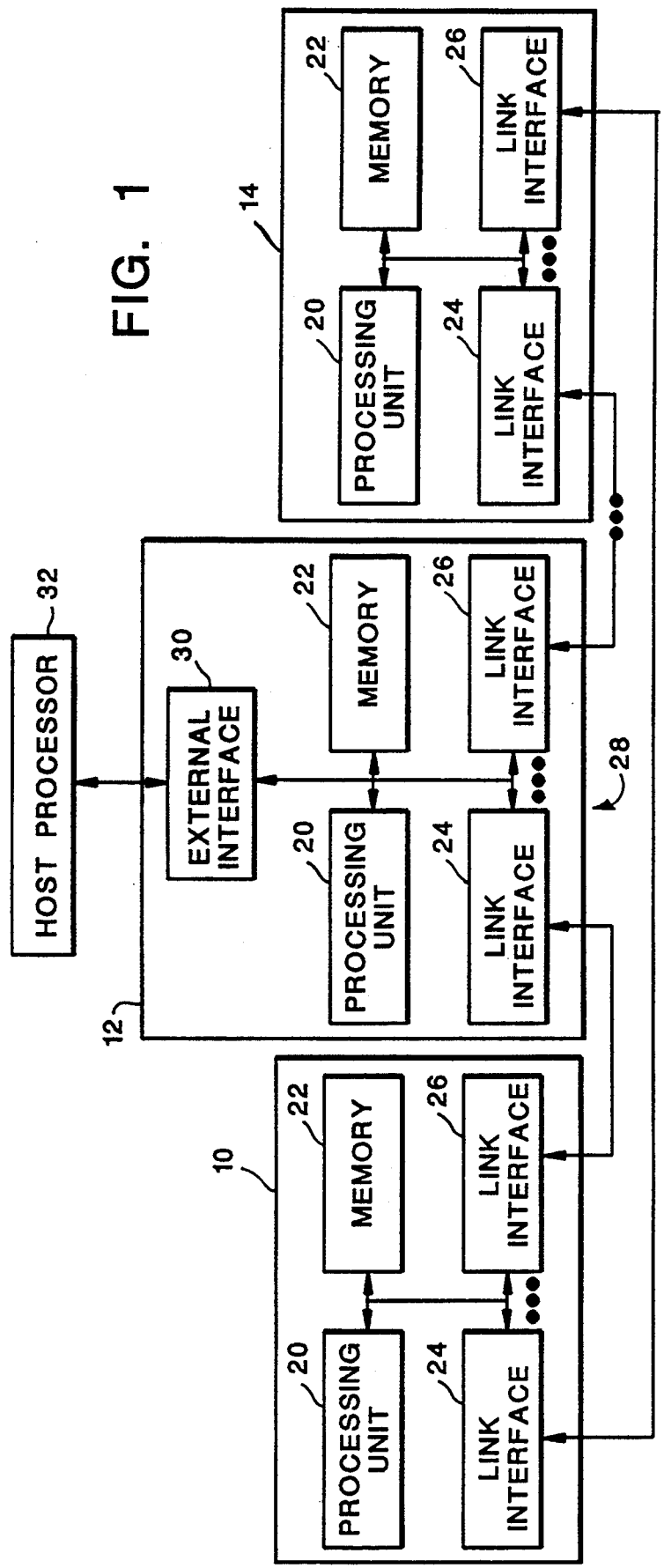
FIG. 1 illustrates the hardware components of ring connected multiprocessors in accordance with the present invention.

The present invention is directed to a method and an apparatus for the efficient redistribution or consolidation of a distributed data set which includes plural data elements distributed in subsets among the processors in a multiprocessor ring-connected network and in which the processors in the ring are interconnected with bidirectional links as illustrated in FIG. 1. The typical situation in which the present invention is useful is to perform a frequency transform operation on a very large image. It is often more efficient to perform a frequency transform on an image if each image line is stored completely in one processor rather than distributed over multiple processors. Each processor 10, 12 and 14 in the ring is preferably an INMOS transputer high performance processor available from Inmos, such as the IMS T800 transputer, running the INMOS operating system. Typically, all the processors in the ring will be on a single circuit board although this is not required. Each processor 10, 12 and 14 includes a processing unit 20 and a memory 22. The processing unit 20 accesses the memory 22 to perform processing operations, such as image processing operations. The memory 22 stores the data subsets to be redistributed and the consolidated data set after consolidation as well as the destination data memory buffer used for communicating the data subsets between the processors 10, 12 and 14. Each processing unit 10, 12 and 14 also includes several link interfaces 24 and 26. The link interfaces are connected such that a processor ring 28 is formed in which the link interface units 24 and 26 of neighboring processors are connected. The ring is discontinuous in the sense that communication around the ring is performed by the processors receiving data and transmitting the data further around the ring. The link interfaces 24 and 26 are direct memory access type link interfaces that, once the processing unit 20 has instructed or flagged the link interface to perform a data communication and provided the link interface with the pointer to the data being transmitted along with the size of the data subset being transmitted, will, in a conventional manner, transmit the data without further operation by the processing unit 20 and indicate to the processing unit 20 when the data transmission is complete. That is, processing unit 20, once a data communication has been commanded or initiated by setting the appropriate flags, can perform other tasks while the communication operation is being performed by the interfaces 24 and 26. The link interfaces 24 and 26 operate in parallel, so that communication (transmitting and receiving) in both directions around the ring can be performed simultaneously by a single processor. At least one of the processors 10, 12 and 14 should include an external interface 30 which communicates with a host processor 32.

During the discussion of the method of the present invention, which performs the efficient redistribution of multiple distributed subsets of a data set on a multiprocessor ring interconnected with bidirectional links, such as illustrated in FIG. 1, the variable p will be used to denote the number of processors 10, 12 and 14 in any such ring. A data set of n elements can be distributed in data subsets over a ring processor with p processors by allocating n/p data elements in a subset to each of p-1 processors with the pth processor having the remainder. The data of any one distributed set that is stored within one processor is referred to here as a subset and a data subset can include plural data elements. The subsets that are stored in a particular processor are called local subsets and subsets stored in other processors are called foreign subsets. Subsets stored locally that are to be transmitted to another processor are called locally stored foreign subsets, subsets that are to be consolidated in the particular processor from other processors are called foreign stored local subsets while subsets that are stored in other processors and are to be transferred on to other processor are called non-local foreign stored subsets. Each data element can be as small as a single bit or as many bytes as desired. It is not necessary, however, that every processor have the same amount of data, that is, the subsets within different processors can be of different sizes (that is, have different numbers of elements with different element sizes). The method described herein will work for any amount and distribution of data, even if some processors have no data at all. However, to achieve the greatest possible communication throughput and to maximize bandwidth utilization of the communication paths between processors, each processor must contain the same size subsets, so that the communications are balanced. Distributed over a processor ring of size p there should be p data sets. The invention described herein will work with fewer distributed data sets but at the cost of redundant communication. When the data sets are distributed, each processor will contain p subsets, one subset from each set. The task is to redistribute or consolidate the $p^2$ data subsets, so that each processor has one complete data set. Thus, we begin with each processor containing p data subsets and end with each processor containing one complete data set.

Figure 2:
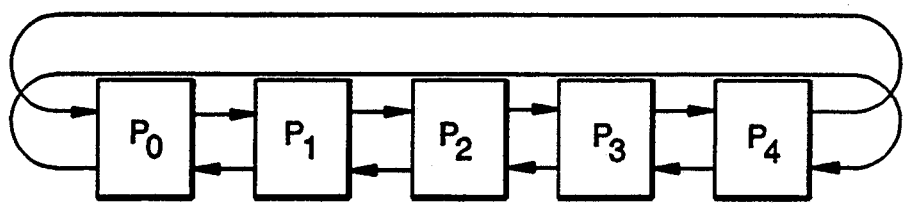
FIG. 2 illustrates a five-processor multiprocessor ring having bidirectional links.
Figure 3:
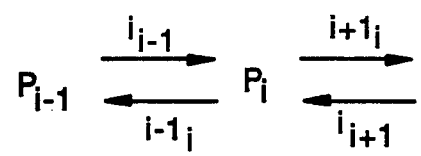
FIG. 3 illustrates the logical communication to or from an arbitrary processor.

A 5-node ring multiprocessor with processors $P_0$–$P_4$ is shown in FIG. 2. The bidirectional links are shown more explicitly as two uni-directional links on each side of the processor. Logically, the communication from each processor's point of view is illustrated by assuming that the ring connection diametrically opposite the processor whose point of view (processor i) we are taking is broken. For example, if processor $P_2$ is processor $P_i$ the link would be hypothetically broken between processors $P_0$ and $P_4$. On each side of that processor $P_i$ data is passed in as shown in FIG. 3. In this Figure the links connecting the processors labelled $P_i$ are shown as arrows and the data being communicated on the links are indicated by the label of the arrow. The link label indicates the data set to which the subset being passed belongs and the subscript indicates the processor of origin. At the first stage the data from the immediate neighbor is received. In the example using $P_2$ the data from $P_1$ and $P_3$ is received by $P_2$. At later stages data is received from neighbors progressively farther away. In the example, at the next stage data from processors $P_0$ and $P_4$ would be received by processor $P_2$. This process continues until all the data subsets are passed into processor $P_i$. At the same time, each processor $P_i$ is passing data it receives, and which is destined for another processor, on around the ring. For example, processor $P_2$ outputs in the first stage data for processors $P_1$ and $P_3$ while it is receiving data from processors $P_1$ and $P_3$. The task for the invention is to so interleave the communications between processors that this distribution is accomplished simultaneously for every processor in the ring while fully utilizing the link communication bandwidth and sending data subsets the minimum possible distance.

To complete all of the data subset transfers, each processor must receive all of the data subsets with a subscript that is the same as its processor number. There must be one fewer of the transfers than there are processors in the ring, one fewer because one of the data subsets is already in the processor to which the other data subsets are being transferred. At the same time, every processor must output all of its data subsets (except the one belonging to itself) to either the right-side or left-side neighbor. Thus, in a 5-node ring each processor, processor $P_2$ in the example, must send out four subsets belonging to foreign processors and stored locally (locally stored foreign subsets) and receive four subsets stored in foreign processors and store them locally (foreign stored local subsets). However, there will be more than four communications, because other subsets which are stored in foreign processors and not to be stored locally (non-local foreign stored subsets) must be passed through a node (processor).

Figure 4:
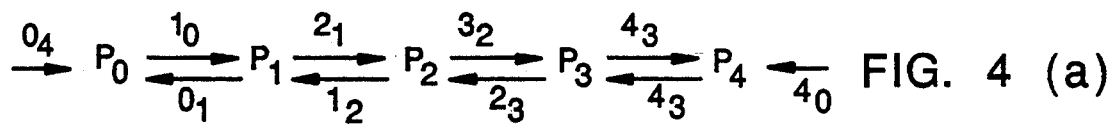
FIGS. 4(a)-4(c) depict communication stages for the five-node ring of FIG. 2.
Figure 4:
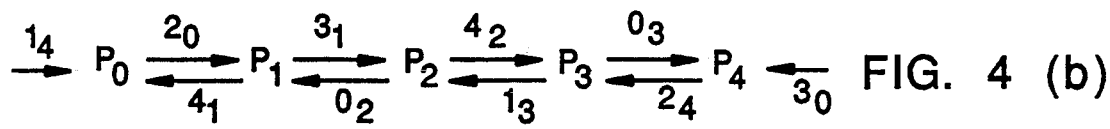
Figure 4:
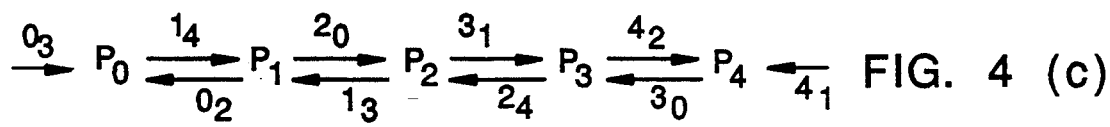

This communication objective is accomplished by requiring every processor in the ring to simultaneously communicate either its data set, or a data set that it has just received, to its neighbors. This task will use every link connected to every processor and is illustrated in FIGS. 4(a)–4(c) for the 5-node system of FIG. 2. In FIGS. 4(a)–4(c), the links connecting the processors labelled P are shown as arrows and the data subset being communicated on the links indicated by the label of the arrow. For example in FIG. 4(b) processor $P_2$ is shown transmitting the subset 2 for processor $P_0$ and subset 2 of processor $P_4$ and receiving subset 1 for processor $P_3$ and subset 3 for processor $P_1$. The link label is the same as that in FIG. 3. Note that if the data subsets are identical in size, every communication will take the same amount of time and the link bandwidth will be saturated. Each of the processors $P_0$–$P_4$ must know the size of each data buffer or the size may be passed as a prefix to the data subset itself.

The number of communication stages N necessary to accomplish all the communications for all the processors is the sum of all integers less than or equal to p/2, where p is the number of nodes (processors) in the ring 28. More formally:

$$N = \sum_{i=1}^{p/2} i \qquad (1)$$

For the first communication (shown in FIG. 4(a)) each processor $P_i$ passes to the right its own data subset corresponding to the i+1 data. (The labelling of the processors in the ring must be in the order of their connection but can start at any arbitrary point.) At the same time each processor passes to the left its own data subset corresponding to the i−1 data subset. Thus processor $P_0$ will pass its subset 1, the subset to be stored in processor $P_1$, to the right and subset 4, the subset to be stored in processor $P_4$ to the left. Processor $P_1$ will pass its subset 2 to the right and subset 0 to the left and so on, so that each processor will always receive two of its destination subsets (foreign stored local subsets), one from each side. The subset labels are calculated modulo the ring size, so that the last processor passes its subset of the first data set right, and the first processor passes its subset of the last data set left.

After the first communication, every processor has received two of the data subsets (foreign stored local subsets) that it requires and sent two subsets (locally stored foreign subsets). The second communication (FIG. 4(b)) from each processor passes the data subset for the processors one removed. Thus processor $P_0$ will pass its subset 2 to the right and 3 to the left. Processor $P_1$ will pass its subset 3 to the right and 4 to the left and so on. This time, however, the processors do not immediately receive a data subset that they need, so the input data received must be output at the next stage.

In the third stage (FIG. 4(c)), each data subset is passed to its final destination. For the 5-node ring this concludes the communication task. Careful examination of FIGS. 4(a)–4(c) will illustrate that every processor has received every required subset.

As ring networks grow larger, the apparent complexity of the communications grow. The communication task can be broken down into four major subtasks: receive and keep a subset, receive a subset and store temporarily, send a local subset, and send a temporary subset stored temporarily. A simple set of rules governs these subtasks. The output rule governing the output of data on either link is this: each processor must output one of its local data subsets followed by m cycles of passing temporary data input from one link and output to the opposite link. The value m begins at zero and increases by one after each output of its local subset. The input rule governing the input of data on either link must complement the output rule: each processor must input a data subset that it will keep followed by n cycles of temporary input which is output at the next cycle, where n begins at one and increases by one after each input. The implementation of these rules is illustrated in Table 1 for an 11-node ring.

TABLE 1

| Stage | Input Operation | Output Operation |
|---|---|---|
| 1 | local n = 1 | local m = 0 |
| 2 | temp | local m = 1 |
| 3 | local n = 2 | temp |
| 4 | temp | local m = 2 |
| 5 | temp | temp |
| 6 | local n = 3 | temp |
| 7 | temp | local m = 3 |
| 8 | temp | temp |
| 9 | temp | temp |
| 10 | local n = 4 | temp |
| 11 | temp | local m = 4 |
| 12 | temp | temp |
| 13 | temp | temp |
| 14 | temp | temp |
| 15 | local | temp |

All input communication stages are identical and all output communication stages are identical. The output operation is shifted in time by one stage with respect to the input. In Table 1, the input and output columns record whether the data subset communicated originates or is needed locally or whether the data subset is in transit. In the input column the word local means that the data received is needed locally (a foreign stored local subset). In the output column the word local means that the data subset is local (a locally stored foreign subset). In the input column the word temp means the data is being input temporarily (a non-local foreign stored subset) and must be passed along at the next stage or, if it is in the output column, the data being output is temporary data that was input at the previous stage. The first three stages of Table 1 can be matched with the three stages illustrated in FIGS. 4(a)–4(c).

Figure 5:
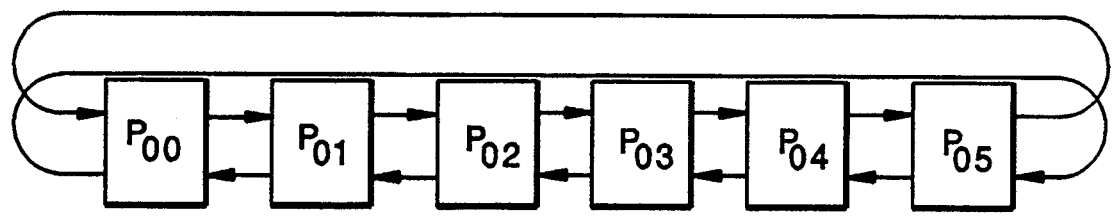
FIG. 5 illustrates a six processor multi-processor ring with bidirectional links.
Figure 6A:
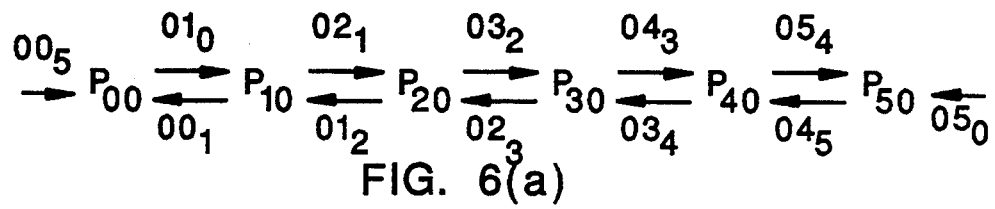
FIGS. 6(a)-6(f) illustrate the communication stages for a six node ring as in FIG. 5.
Figure 6B:
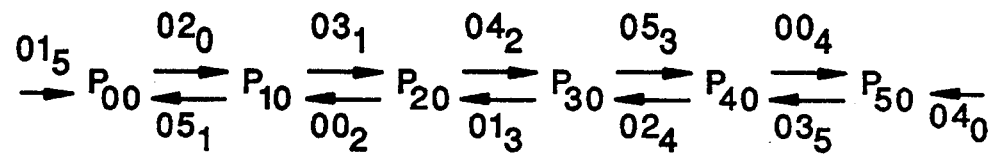
Figure 6C:
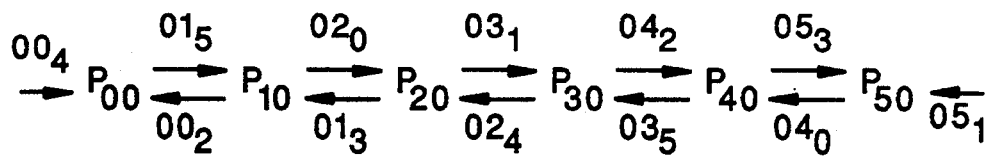
Figure 6D:
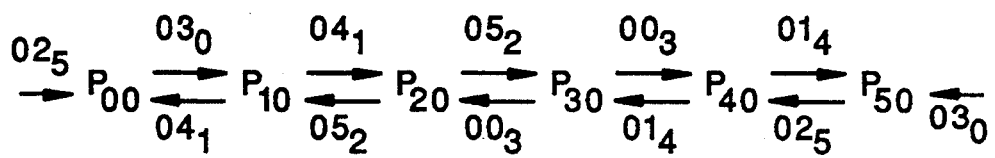
Figure 6E:
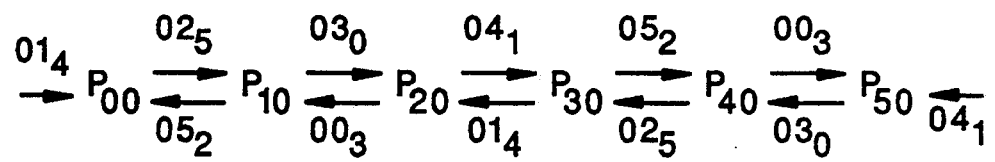
Figure 6F:
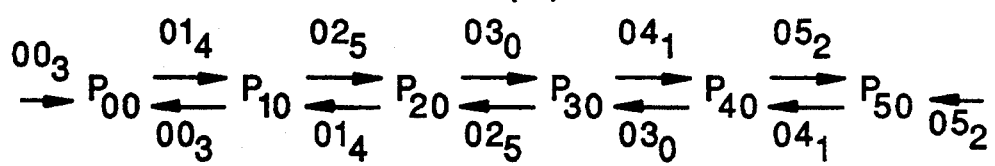

A slightly longer example of the communication stages is given in FIGS. 5 and 6(a)–(f). FIG. 5 shows a 6-node ring with processors $P_{00}$–$P_{05}$ while FIG. 6 illustrates the order of communication and can be compared with the first six stages of Table 1. Note that each processor in the last communication stage for the 6-node ring inputs the identical data from both sides. This is true for any even-sized ring, but false for an odd-sized ring. This is because, in an odd sized ring, the same number of processors are on each side of any processor if the diametrically opposite link is broken. For an even sized ring however, there is a processor rather than a link diametrically opposite and this processor will output the same data subset in both directions at the last stage. To reduce the total amount of work, an even-sized ring of processors could pass the last data subsets in one direction only or one of the subsets received in the last stage can be discarded, as will be discussed later with respect to FIG. 12. Except for this minor difference, the implementation is identical for any ring network size.

The rules governing the order in which the local data subsets are input or output are quite simple. The local data subsets output to the left for processor $P_i$ begin with the data subset for data set $i-1$ and continue with the data subset for data set $i-2$, then $i-3$ and so on. The local data subsets output to the right begin with the data subset for data set $i+1$ and continue with the data subset for data set $i+2$, then $i+3$ and so on. The local data subsets input from the right begin with the same subset as the right side output, and the left-side input begins with the same subset as the left side output. The data set positions are all calculated modulo the data set size, so that if a pointer to a data buffer array storing the subsets moves past the left side of the array (becomes less than zero) the pointer is reset to the right side of the array and if the pointer moves past the right side of the array it is reset to zero.

These rules for data output are trivially implemented with the use of pointers into the original memory data subsets stored in an array, for example. For processor $P_i$, the left output pointer, $L_{out}$, is set to the data subset for data set $i-1$ and, after each left side output of a local data subset, is decremented to point to the previous data set. The right output pointer, $R_{out}$, is set to the data subset for data set $i+1$ and, after each right side output of a local data subset, is incremented to point to the following data set. One possible distribution of a data set 60 over a 6-node processor ring, such as in FIG. 5, is illustrated in FIG. 7 where the data set includes six subsets each with a varying number of elements, for example the subset in processor $P_{02}$ includes seven elements. The corresponding pointer movements across the data buffer array 70 for three stages are graphically shown in FIGS. 8(a)–8(c) for processor $P_{02}$. The data elements in this example are not evenly distributed over the processor ring because the pointer movements are more easily understood when the subsets have different sizes (different numbers of elements).

Figure 9A:
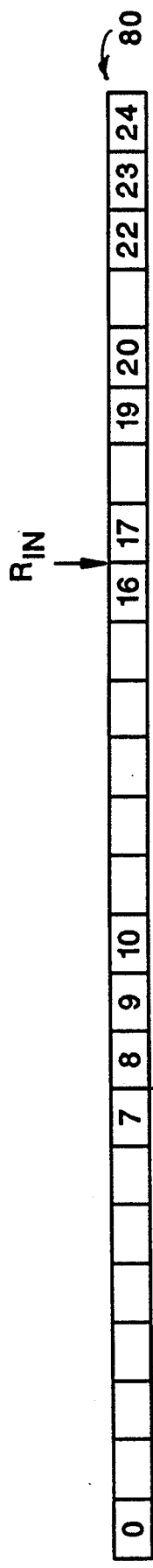
FIGS. 9(a)-9(c) illustrate the input pointer positions for the three stages for processor $P_{02}$ in the six-processor ring of FIG. 5.
Figure 9B:
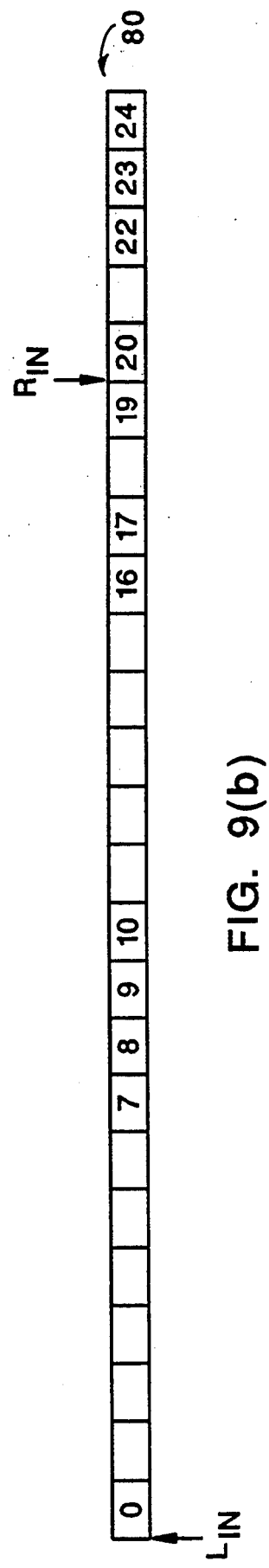
Figure 9C:
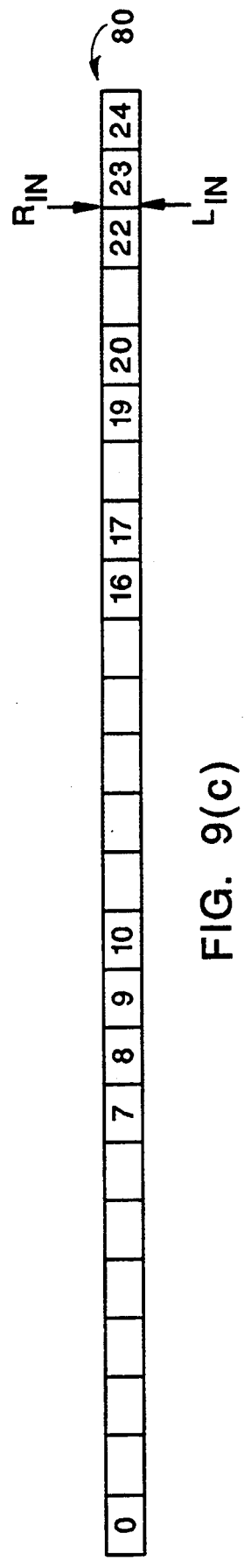

The rules for data input are also implemented with the use of pointers into a destination data buffer 80, as illustrated in FIGS. 9(a)–9(c), where the acquired or received data subsets are stored. The destination is not necessarily the same location as the original source data subsets since the data set may be different in size if the data is not distributed perfectly evenly That is, the destination cannot overwrite the source because the consolidated data set may be different in size from the local subsets. As a result, two completely separate buffers are used. If, however, all local subsets are identical in size, the consolidated data could overwrite the source. During operation for processor $P_i$, the left input pointer, $L_{in}$ is set to the data subset for data set $i-1$ and, after each left side input of a local data subset, is decremented to point to the previous data subset. The right input pointer, $R_{in}$, is set to the data subset for data set $i+1$ and, after each right side input of a local data subset, is incremented to point to the following data subset. This is graphically shown in FIGS. 9(a)–9(c) for processor $P_{02}$ of FIG. 7 where FIG. 9(a) shows the initial position, FIG. 9(b) shows the position before stage 2 and FIG. 9(c) shows the position before stage 3. Another issue to be considered and resolved is the control of input and output for data subsets that neither originate locally or end up locally. Four temporary buffers (not shown in the drawings) are used to pass the data along. Two of the temporary buffers are used to pass data from left to right and two of the temporary buffers are used to pass data from right to left. These temporary buffers must be large enough to hold the largest data subset found in any processor. In the example of FIG. 7 the temporary buffers must hold at least 8 data elements. The buffer pairs are used to double buffer the communication, so that as data is input from one side into one buffer, the data received in the previous communication stage is output from the other buffer. The buffers are then exchanged (or pointers to the buffers are swapped), so that what was previously input is ready for output and what was previously output can be overwritten by a new input.

This interprocessor communication technique will work in the same way in reverse. In this case, data sets which are stored individually on each processor in the ring will be distributed over the ring. The steps are identical, but taken in the reverse order.

Figure 10:
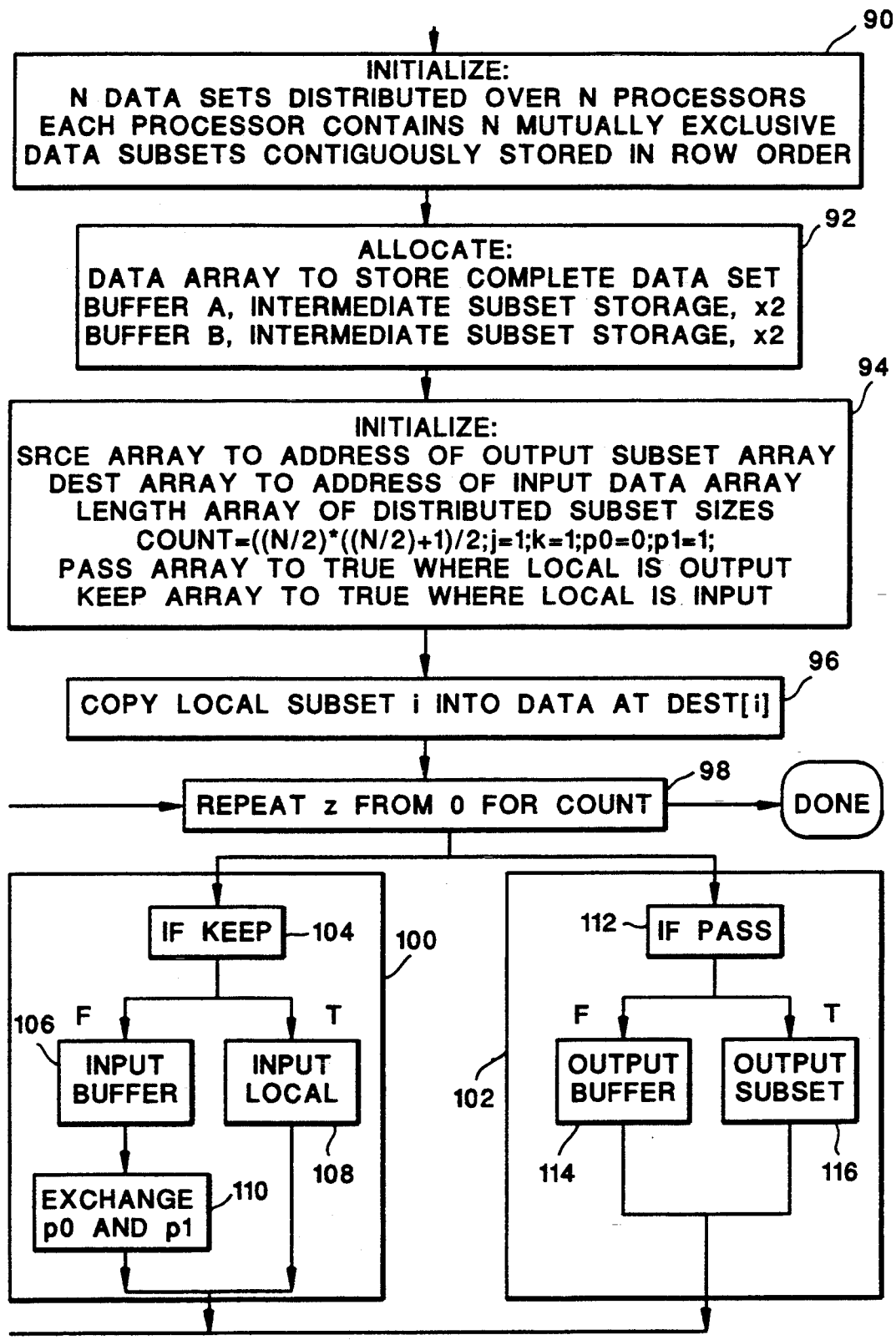
FIG. 10 is a flowchart of the operations performed by each of the processors in a ring.

The processes performed by each processor previously discussed and illustrated graphically starts, as illustrated in FIG. 10 by distributing 90 the data sets. The system then allocates 92 the data destination buffer to store the consolidated data set and also allocates the temporary buffers for transferring data through the processor. The system then initializes 94 source, destination, length, pass and keep arrays where the pass and keep arrays are of size count where count is defined as shown in FIG. 10 and determined in accordance with equation 1 and the source destination and length arrays are of size n. The processor then moves the data elements stored locally which must be consolidated into the complete data set for that processor into the destination array at the proper location. Once the initialization and the internal local transfer occurs, the system enters a loop which is repeated 98 until all data subsets are transmitted from, received and stored in or transferred through the processor. In the loop the system performs input 100 and output 102 operations simultaneously. The decision making steps performed in operations 100 and 102 are preferably performed in parallel processes, which, in a single processor, are implemented preferably by time slicing the central processing unit in a conventional manner. These decision making operations can be processed at the same time as the link communication operations because the link interface units in each processor are direct memory access type units which function independentally of the processing unit. Within the input operation if the keep array value when tested 104 is false, the input is temporarily buffered 106 as illustrated in more detail in FIG. 11. If the input data is to be kept, the data is input and stored 108 locally as described in more detail with respect to FIG. 12. When the inputs are buffered, the pointers are exchanged 110. If the pass variable when tested 112 is false, the content of the temporary buffer is output 114 as described in more detail with respect to FIG. 13 otherwise the local subset is output 116 as described in more detail in FIG. 14.

Figure 11:
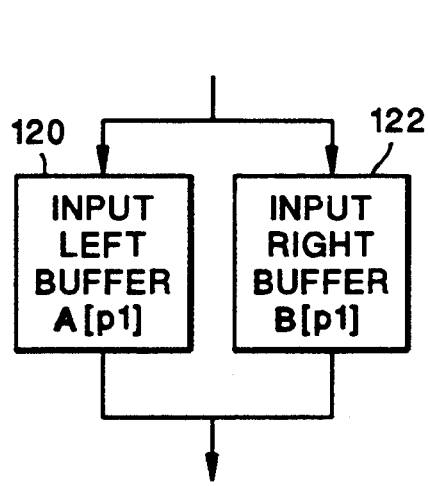
FIGS. 11-14 illustrate in more detail various processes of FIG. 10.
Figure 12:
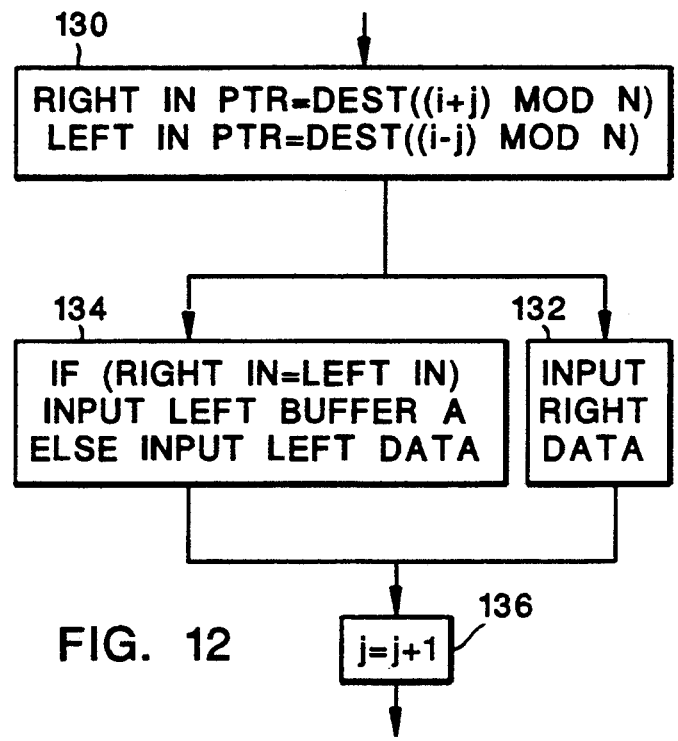
Figure 13:
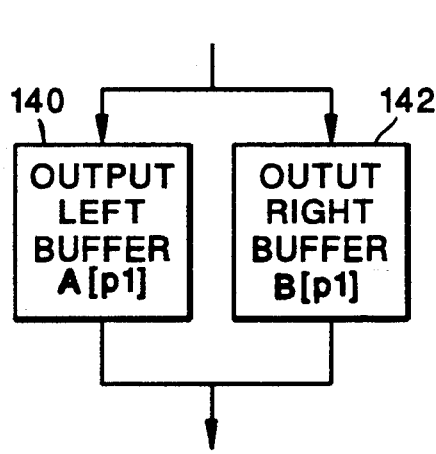

As illustrated in FIG. 11, during an input operation, in which the data is to be temporarily stored both the left and right input operations are commanded 120 and 122 at the same time. When the input is to be stored locally, the pointers are updated 130, as illustrated in FIG. 12, and the right input operation is commanded 132. Step 134 performs the input of the left data into the destination data array only when the right input pointer and the left input pointer are not equal. Otherwise the data is placed in a buffer which will be overwritten. This solves the problem of receiving identical data subsets from both directions during the last transfer. Step 136 updates the pointer calculation arguments.

Figure 14:
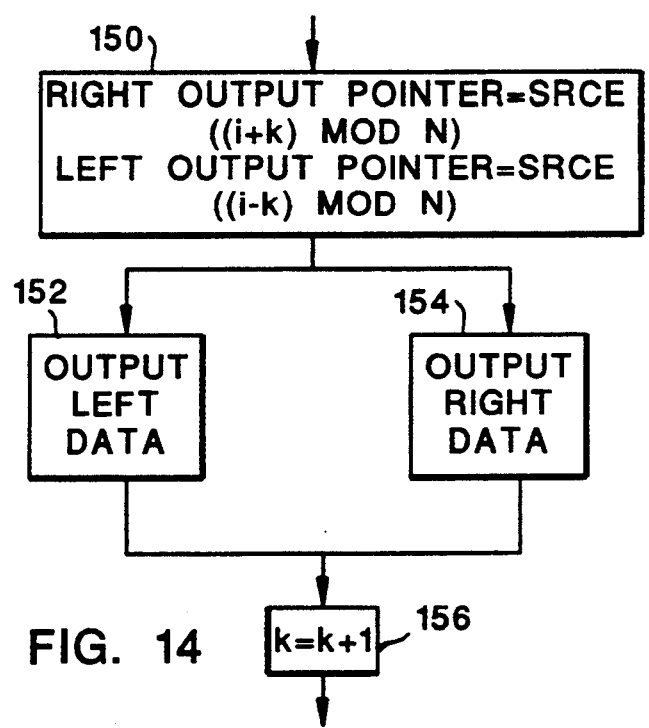

The output operation, as illustrated in FIG. 13, is once again simultaneously commanded 140 and 142. As illustrated in FIG. 14, the output operation for subset output involves updating 150 the output pointers and simultaneously commanding 152 and 154 the output of the appropriate data by setting the hardware flags previously mentioned, The pointer calculation counter is then updated 156.

Figure 15:
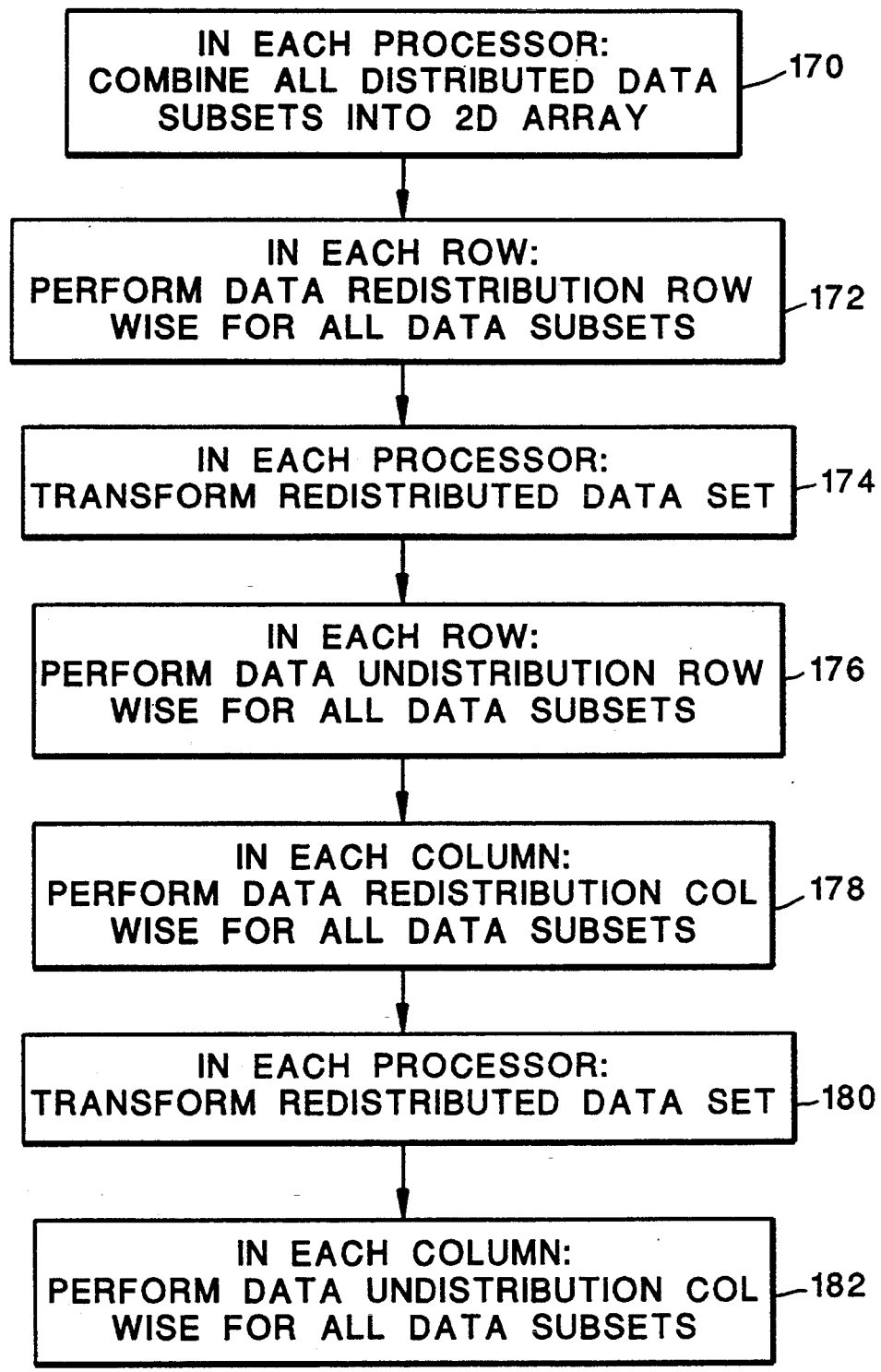
FIG. 15 is a flowchart of a two-dimensional data transform or redistribution for a two-dimensional array of data sets.
Figure 16A:
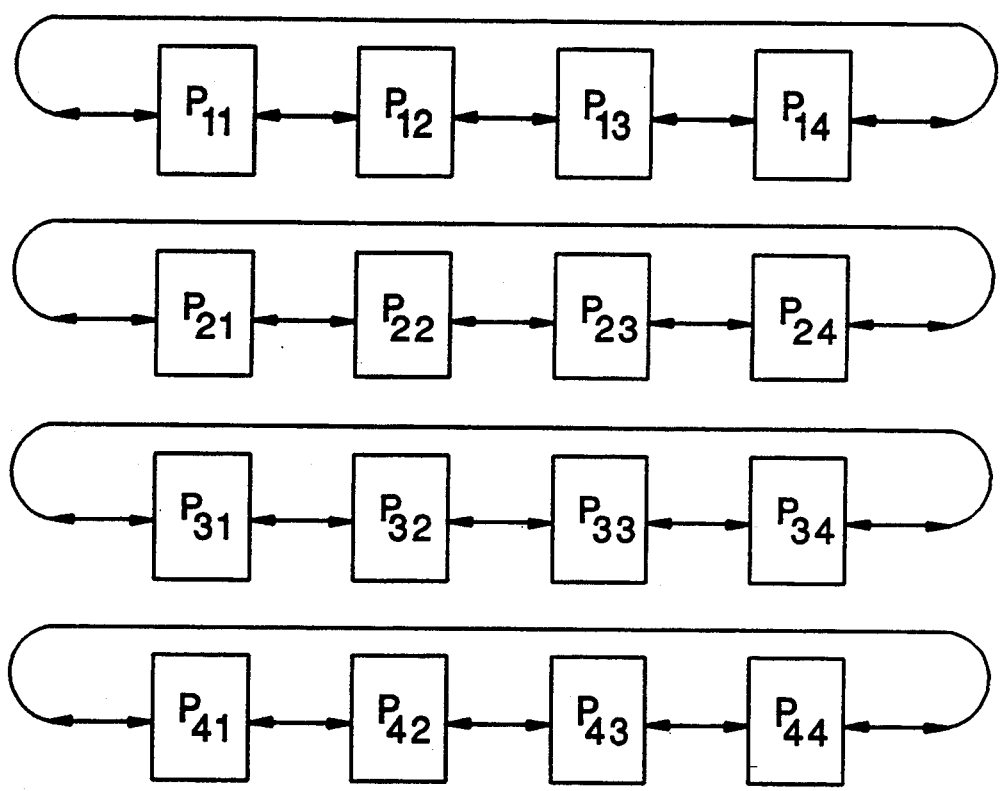
FIGS. 16(a) and 16(b) depict the operations performed by the process of FIG. 15.
Figure 16B:
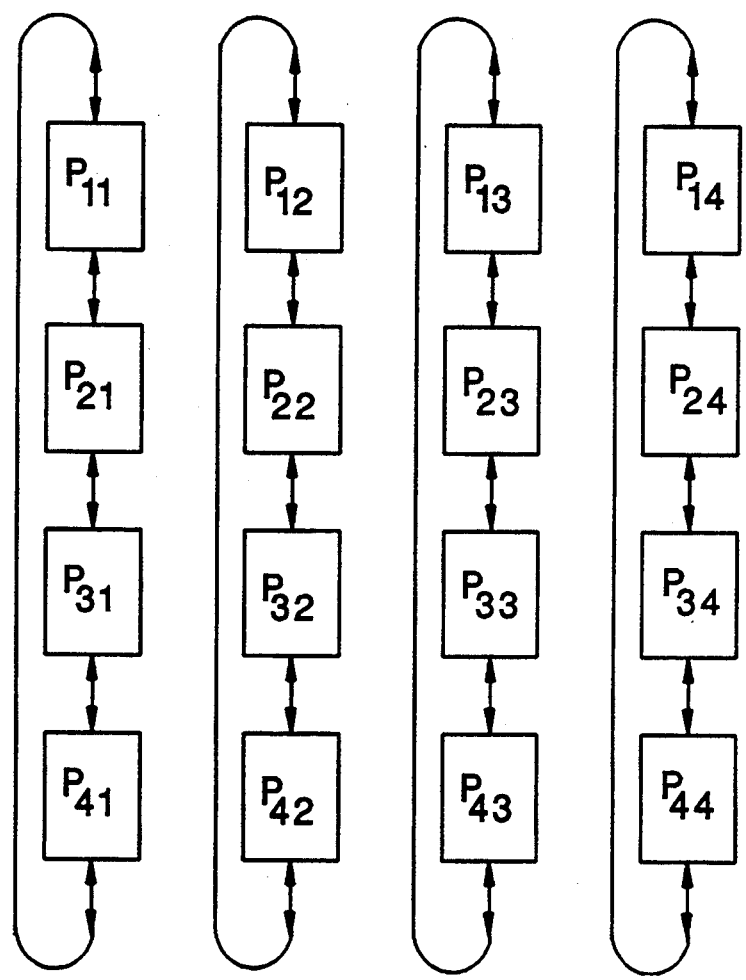

Although the present invention has been described with respect to transfer around a ring in a single dimension, the present invention is applicable to transferring data in a two dimensional system in which processors are connected both in row and column rings. A two dimensional transfer operation is illustrated in FIG. 15 and starts by combining 170 all the distributed data sets in a single processor into a two dimensional array. The system then performs 172 a row transfer operation in which the subsets are redistributed in a row wise direction. The system then transforms 174 the data in each processor. The system then performs 176 the undistribution operation, which is the reverse of the distribution operation, as previously discussed. Next, the processor performs 178 a redistribution of all data subsets. The processor then performs a transformation 180 of the redistributed data set followed by performing the undistribution operation 182 which is the opposite of the redistribution operation as previously discussed. FIG. 16(a) illustrates the communication operations within a matrix of processors during steps 172 and 176 of FIG. 15 while FIG. 16(b) illustrates the steps performed in steps 178 and 182.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of redistributing multiple distributed data sets in a ring of processors having first and second directions of communication, the data sets being distributed as data subsets in the processors, whereby each processor contains a subset from one of the data sets, the data subsets being redistributed such that every processor will contain one unique complete data set, the data subsets to be stored in a particular processor being local data subsets with respect to that particular processor, and the data subsets to be stored in other processors being foreign data subsets with respect particular processor, comprising the steps of:
   a) transmitting from each processor foreign data subsets stored in that processor in both the first and second directions;
   b) transmitting from each processor foreign data subsets in the first and second directions when received by that processor in the first and second directions, respectively;

c) storing in each processor local data subsets when received from other processors in the first and second directions; and d) repeating steps b) and c) until every processor processor has received and stored every on of its own local data subsets to form a unite complete data set.

2. A method as recited in claim 1, wherein step (b) includes:

(b1) in each processor, storing data subsets received in a temporary input buffer and storing data subsets to be transmitted in a temporary output buffer; and (b2) converting the temporary input buffer into the temporary output buffer and converting the temporary output buffer into the temporary input buffer.

3. A method of redistributing multiple distributed data sets in a ring of processors, the ring having first and second directions of communication, the data sets being distributed as data subsets in the processors, whereby each processor contains a subset from one of the data sets, the data subsets being redistributed such that every processor will contain one unique complete data set, the data subsets to be stored in a particular processor being local data subsets with respect to that particular processor, and the data subsets to be stored in other processors being foreign data subsets with respect particular processor, said method comprising the steps for each processor i;

(a) transmitting a data subset for the i−1th processor in the first direction, transmitting a data subset for the i+1th processor in the second direction, receiving and storing local data subsets for the ith processor received in the first and second directions;

(b) transmitting a data subset for the i-nth processor in the first direction, transmitting a data subset for the i+nth processor in the second direction, receiving in the first direct. ion and storing temporarily a data subset for the i+(n−1)th processor, and receiving in the second direction and storing temporarily a data subset for the i−(n−1)th processor, where n starts at 2 and increments by 1 each time this stem is performed;

(c) transmitting the temporarily stored data subsets in the first and second directions, respectively, and receiving and storing local data subsets received in the first and second directions; and (d) repeating steps b) and c) until every processor i has received and stored every one of its own local data subsets to form a unique complete data set.

* * * * *